No. 629,983. Patented Aug. 1, 1899.
E. S. BRIGHT & G. F. SMITH.
MACHINE FOR ROLLING DOUGH INTO CYLINDRICAL SHAPES.
(Application filed Mar. 18, 1898.)
(No Model.)
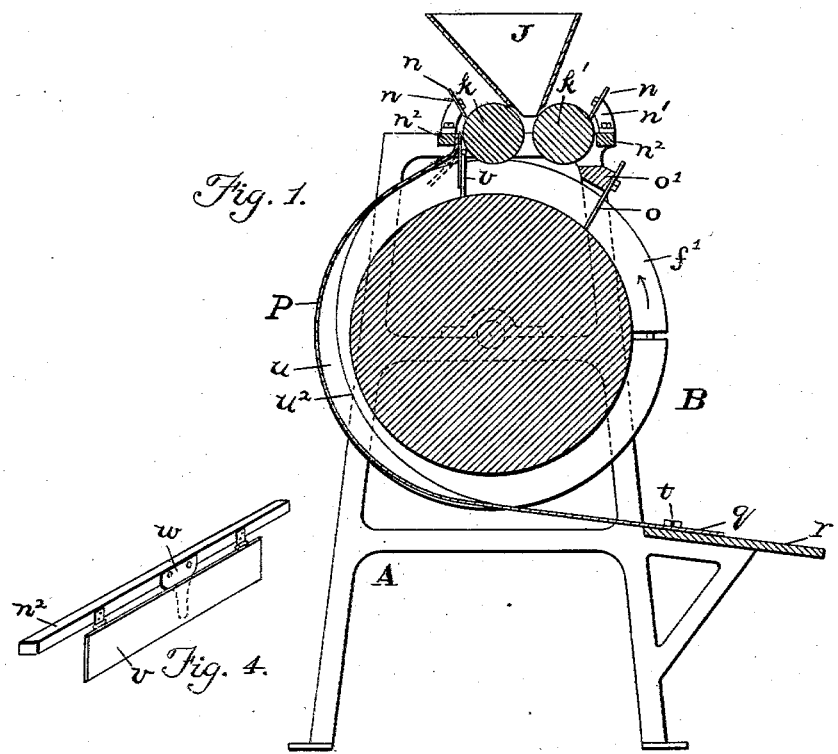
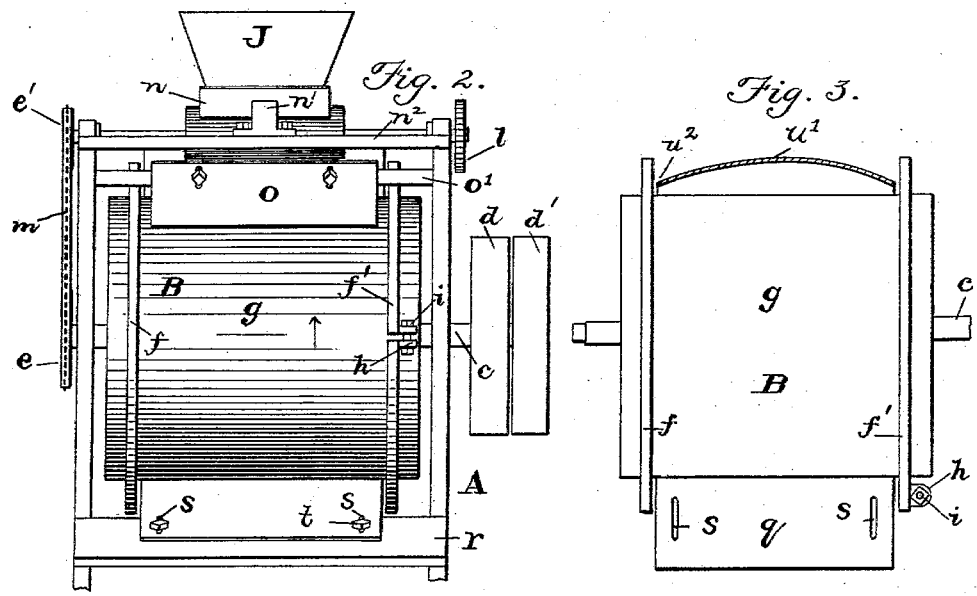
Witnesses:—
Lee J. Van Horn
Charles B. Mann Jr.
Inventors:—
Edward S. Bright
George F. Smith
By Chas. B. Mann
Attorney.
THE NORRIS PETERS CO., PHOTO-LITHO., WASHINGTON, D. C.

UNITED STATES PATENT OFFICE.

EDWARD S. BRIGHT AND GEORGE F. SMITH, OF BALTIMORE, MARYLAND, ASSIGNORS TO THEMSELVES, DUANE H. RICE, AND LEWIS C. RICE, OF SAME PLACE.

MACHINE FOR ROLLING DOUGH INTO CYLINDRICAL SHAPES.

SPECIFICATION forming part of Letters Patent No. 629,983, dated August 1, 1899.

Application filed March 18, 1898. Serial No. 674,343. (No model.)

*To all whom it may concern:*

Be it known that we, EDWARD S. BRIGHT and GEORGE F. SMITH, citizens of the United States, residing at Baltimore, in the State of Maryland, have invented certain new and useful Improvements in Machines for Rolling Dough into Cylindric Shapes, of which the following is a specification.

This invention relates to a machine for rolling dough into cylindric-shaped loaves for bread-making.

The object of the invention is to provide a machine of simple construction for use in bakeries, adapted to form dough into cylindric loaves rapidly.

The invention is illustrated in the accompanying drawings, in which—

Figure 1 is a vertical section of the machine. Fig. 2 is a front elevation of the machine, the lower part of the supporting-frame being broken away. Fig. 3 is a horizontal plan view of the roller and concave plate and shows the relation of these two parts. Fig. 4 is a detail of the gate.

The frame A may be made of any preferred form and any suitable material. A cylindric roller B has a shaft $c$, which is mounted in bearings on this frame. Fast and loose pulleys $d\ d'$ are on one end of the shaft, and a sprocket-wheel $e$ is on the other end. The roller carries near each end a circumferential flange or collar $f f'$. The center space $g$ between these two flanges constitutes the working face of the roller. We prefer to have this working face adjustable as to length in order to produce cylinders of dough of greater or less length. To this end we have either one or both of the flanges or collars movable on the roller. In the present instance we show only one of the flanges so constructed. This flange $f'$ is a split ring having at each end a lug $h$ with a bolt-hole in it, and a bolt $i$ through the hole of both lugs serves to draw the two ends together and tighten the flange or collar around the roller.

Above the large roller B is a guide or hopper J, mounted on top of the frame. Two small rollers $k\ k'$ are mounted below the hopper and between it and the large roller. As the chunk of dough passes from the hopper it is squeezed through the two small rollers and then drops onto the large roller B. The shafts of the squeezing-rollers at one end are geared together by wheels $l$. One of the shafts at the other end has a sprocket-wheel $e'$, and a chain $m$ connects from the sprocket-wheel $e$ on the main shaft $c$ to the said wheel $e'$.

Each of the squeezing-rollers has a scraper-plate $n$, supported on a stud $n'$, which is mounted on a cross-bar $n^2$ at the top of the frame. These scraper-plates bear lightly on the rollers and serve to remove any particles of adhering dough. The large roller also has its surface cleaned by a scraper-plate $o$, which is attached to a cross-bar $o'$. A sheet-metal concave plate P has its upper end fast or immovable at the top of the frame and therefrom curves down at the rear side of the roller B and forms a passage $u$, and thence extends under the roller toward the front, its end $q$ terminating on a shelf or bracket $r$ at the front. This end of plate P has two slots $s$, and a screw $t$ passes through each slot into the shelf $r$. By this construction of slots the concave or back plate P may have its lower end adjusted backward or forward to regulate the size of the lower end of the passage $u$ and make it as much narrower than the upper end as may be required to produce the desired effect on the dough. That part of the plate that curves down at the back of the roller may be curved or concaved in the cross-direction, as at $u'$. (See Fig. 3.) The curved-up edge $u^2$ can also be seen in Fig. 1.

By having the cross-surface of the plate P curved, as at $u'$, instead of flat the dough will be formed into cylinders having rounded or tapered ends. Of course the cross-surface of the plate may be flat instead of curved, and then the dough would be formed into cylinders with square ends.

A gate $v$ is hinged at the top, so as to swing between the two flanges $f f'$ on the large roller. This gate is located just back of both squeezing-rollers $k\ k'$. It is a horizontal plate hinged at its upper edge and its lower edge being free and bearing on the surface of the roller B. A spring $w$ is back of the hinged gate $v$ and serves to press the latter forward and close the entrance to the passage $u$. In operation when a chunk of dough is squeezed through the two rollers k k' and drops onto the large roller it first comes in contact with the spring-pressed gate, which latter offers a slight resistance to its passage. This resistance will be sufficient to prevent the dough from slipping down the passage u in sheet form, but will not completely hinder its passage. The gate will cause the dough to double up in a bunch, and it will pass the gate in that form and then will be rolled when it enters the passage.

Chunks of dough of the exact size for each shape or each loaf are placed one at a time in rapid succession into the hopper J, and the cylindric dough shapes will be delivered one at a time down the inclined front end q onto the bracket r.

Having thus described our invention, what we claim is—

1. A machine for rolling dough into cylindric shapes having in combination a frame; a dough-receiving guide or hopper above the frame; two squeezing-rollers below the hopper; a cylindric roller relatively much larger than the said squeezing-rollers and below the latter; and a concave back at one side of said large roller and having its upper end secured or immovable and adjustable at its lower end only, so as to form a curved passage, u, whose lower end may be made narrower than the upper end, as set forth.

2. A machine for rolling dough into cylindric shapes having in combination a frame; a dough-receiving guide or hopper above the frame; a cylindric roller revoluble below the said guide or hopper; a shelf or bracket, r, attached to the frame below the said roller; and a concave back at one side of the roller and also extending under the roller to the said shelf or bracket—the upper end of the concave back being secured immovable and the lower end provided with means for its adjustment on the shelf or bracket, whereby the curved passage formed between the roller and back may have the width of its lower portion adjusted without materially altering the width of its upper portion.

In testimony whereof we affix our signatures in the presence of two witnesses.

EDWARD S. BRIGHT.
GEORGE F. SMITH.

Witnesses:
CHAS. B. MANN,
CHARLES B. MANN, Jr.